United States Patent [19]
Yoon et al.

[11] Patent Number: 5,502,696
[45] Date of Patent: Mar. 26, 1996

[54] CD-ROM SUBCODE R-W CHANNEL DE-INTERLEAVING AND DE-SCRAMBLING METHOD AND APPARATUS

[75] Inventors: Tony J. Yoon, San Jose; Michael J. McGrath, Sunnyvale; Phuc Tran, Milpitas, all of Calif.

[73] Assignee: Cirrus Logic, Inc., Fremont, Calif.

[21] Appl. No.: 311,069

[22] Filed: Sep. 23, 1994

[51] Int. Cl.[6] .................................................. G11B 17/22
[52] U.S. Cl. ................................ 369/32; 369/33; 369/59
[58] Field of Search ................................ 369/32, 30, 33, 369/59, 111, 275.3, 109, 44.26, 34, 54, 58; 370/110.1, 84, 58.1, 58.2; 371/40.1, 37.1; 360/72.2, 78.04; 395/425; 235/375

[56] References Cited

U.S. PATENT DOCUMENTS

| | | | |
|---|---|---|---|
| 4,802,152 | 1/1989 | Markvoort et al. | 369/32 |
| 4,871,903 | 10/1989 | Carrell | 235/375 |
| 5,216,656 | 6/1993 | Sake et al. | 369/59 |
| 5,293,606 | 3/1994 | Sassenrath | 395/425 |

*Primary Examiner*—Ali Neyzari
*Attorney, Agent, or Firm*—Haverstock & Associates

[57] ABSTRACT

A subcode R-W channel data de-interleaving and de-scrambling method and apparatus includes the ability to de-interleave and de-scramble the encoded subchannel data without the necessity of storage elements, by dynamically calculating the final location of each byte of data within a packet as it is read from the CD-Rom. A pack counter monitors the pack number of the current byte of data. An index counter monitors the location of the current data within a pack. A subtractor uses the values from the pack counter and the index counter to obtain an input value, a first portion of which is supplied to a first offset generator. A second portion of the subtractor output is used to select a base address. The first offset generator determines the pack number of the current byte of data after the de-interleave process. A second offset generator receives a value from the index counter and generates a corresponding value. The results from the first offset generator and the second offset generator are both input into a first adder. The output of the first adder is added to the selected base address by a second adder in order to calculate the final address. The final address is transmitted with the current byte of data to an external buffer memory, where it is stored in the specified address. Preferably the present invention is included in a dedicated integrated circuit which calculates the final address of each byte of subchannel R-W data as it is read.

20 Claims, 4 Drawing Sheets

FIG. 1

```
PACK 0   D0
PACK 1      D1
PACK 2         D2
PACK 3            D3
PACK 4               D4
PACK 5                  D5
PACK 6                     D6
PACK 7                        D7
            D8
               D9
                  D10
                     D11
                        D12
                           D13
                              D14
                                 D15
                                    D16
                                       D17
                                          D18
                                             D19
                                                D20
                                                   D21
                                                      D22
                                                         D23
```

FIG. 2

```
PACK 0  D0
PACK 1  E0  D1
PACK 2      E1  D2
PACK 3          E2  D3
PACK 4              E3  D4
PACK 5                  E4  D5
PACK 6                      E5  D6
PACK 7                          E6  D7
PACK 8                              E7
              D8
              E8  D9
                  E9  D10
                      E10 D11
                          E11 D12
                              E12 D13
                                  E13 D14
                                      E14 D15
                                          E15
                                              D16
                                              E16 D17
                                                  E17 D18
                                                      E18 D19
                                                          E19 D20
                                                              E20 D21
                                                                  E21 D22
                                                                      E22 D23
                                                                          E23
```

|        |     |     |     |     |     |     |     |     |     |     |     |     |     |     |     |     |     |     |     |     |     |     |     |
|--------|-----|-----|-----|-----|-----|-----|-----|-----|-----|-----|-----|-----|-----|-----|-----|-----|-----|-----|-----|-----|-----|-----|-----|
| PACK 0 | D0 |     |     |     |     |     |     |     |     |     |     |     |     |     |     |     |     |     |     |     |     |     |     |
| PACK 1 | E0 | D18 |     |     |     |     |     |     |     |     |     |     |     |     |     |     |     |     |     |     |     |     |     |
| PACK 2 | F0 | E18 | D5 |     |     |     |     |     |     |     |     |     |     |     |     |     |     |     |     |     |     |     |     |
| PACK 3 | G0 | F18 | E5 | D23 |     |     |     |     |     |     |     |     |     |     |     |     |     |     |     |     |     |     |     |
| PACK 4 |    | G18 | F5 | E23 | D4 |     |     |     | D8 |     |     |     |     |     |     |     | D16 |     |     |     |     |     |     |
| PACK 5 |    |     | G5 | F23 | E4 | D2 |     |     | E8 | D9 |     |     |     |     |     |     | E16 | D17 |     |     |     |     |     |
| PACK 6 |    |     |    | G23 | F4 | E2 | D6 |     | F8 | E9 | D10 |     |     |     |     |     | F16 | E17 | D1 |     |     |     |     |     |
| PACK 7 |    |     |    |     | G4 | F2 | E6 | D7 | G8 | F9 | E10 | D11 |     |     |     |     | G16 | F17 | E1 | D19 |     |     |     |     |
| PACK 8 |    |     |    |     |    | G2 | F6 | E7 |    | G9 | F10 | E11 | D12 |     |     |     |     | G17 | F1 | E19 | D20 |     |     |     |
| PACK 9 |    |     |    |     |    |    | G6 | F7 |    |    | G10 | F11 | E12 | D13 |     |     |     |     | G1 | F19 | E20 | D21 |     |     |
| PACK 10 |   |     |    |     |    |    |    | G7 |    |    |     | G11 | F12 | E13 | D14 |     |     |     |     | G19 | F20 | E21 | D22 |     |

| m[4:0] | OFFSET |
|---|---|
| 0 | 0 |
| 1 | 18 |
| 2 | 5 |
| 3 | 23 |
| 4 | 4 |
| 5 | 2 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 1 |
| 19 | 19 |
| 20 | 20 |
| 21 | 21 |
| 22 | 22 |
| 23 | 3 |

CD-ROM SUBCODE R-W CHANNEL DE-INTERLEAVING AND DE-SCRAMBLING METHOD AND APPARATUS

FIELD OF THE INVENTION

The present invention relates to the field of de-interleaving and de-scrambling data read from a CD-Rom. More specifically, the present invention relates to the field of de-interleaving and de-scrambling subchannel data read from a CD-Rom using hardware circuitry.

BACKGROUND OF THE INVENTION

CD-Rom media contain subcode R-W channel data which corresponds to and is stored along with the main channel data. Ninety-six bytes of corresponding subcode R-W channel data stored in a unit referred to as a packet typically accompany each sector of the main channel data. Each packet is divided into four packs each containing twenty-four bytes of data. The subcode R-W channel data is six bits wide. The subcode R-W channel data is encoded by an 8-way interleaving process as well as scrambling within each pack.

An error correction code is used to ensure the data in the subcode R-W channel. To improve the burst error correction capability, the 8-way interleaving process is added to the error-correction system. For example, the fourth, twelfth and twentieth bytes D3, D11 and D19, respectively, are stored in the fourth pack Pack 3. In the interleaving process each pack's 24 bytes of data are spread over eight packs by an 8-way interleave as illustrated in FIG. 1. In the interleave process as illustrated in FIG. 1, the 24 bytes of the first pack are designated as Di, where i is equal to 0 through 23. The byte Di will be located in pack y, as calculated using the following equation (1), at location i, where x is equal to the original pack number ranging from 0 to infinity and i is equal to the byte location of the original pack data.

$$y = x + (i \bmod 8) \quad (1)$$

FIG. 2 illustrates the interleaving of the first pack Di with the original 24 bytes of the second pack Ei. The third Fi and fourth packs Gi are interleaved in the same manner as the first two packs.

Before the packs are interleaved, each pack is scrambled by swapping three pairs of bytes within each of the four packs. During scrambling, if the bytes within a pack are denoted by Xi (i=0 to 23), the byte X1 is swapped with the byte X18, the byte X2 is swapped with the byte X5 and the byte X3 is swapped with the byte X23, within each pack.

A full packet of subchannel R-W data, made up of four packs, Di, Ei, Fi and Gi, each having twenty-four bytes, is illustrated in FIG. 3 showing the 8-way interleave and scrambling of each pack. As is evident from FIG. 3, after interleaving and scrambling, the data for one packet of subchannel R-W data is spread over eleven packs. The bytes of data within the third pack of this packet are denoted by Fi, where i is equal to the number of the byte within the pack. The bytes of data within the fourth pack of this packet are denoted by Gi, where i is equal to the number of the byte within the pack.

When recorded on the CD-Rom, the sub-code R-W channel data is scrambled and then interleaved as explained above. Therefore, when the sub-code R-W channel data is read from the CD-Rom the packs must be de-interleaved and de-scrambled in order to be transferred to the host in a correct and meaningful order. A prior art de-interleaving and de-scrambling method transfers the encoded subchannel R-W data bytes to an external buffer memory in the order that they are read. A system local processor coupled to the buffer memory will then perform the de-interleaving and de-scrambling of the packs. This approach however, requires big overhead for the local processor's computing power as well as consuming valuable buffer memory bandwidth.

A second prior art method uses an on-the-fly hardware de-interleaving and de-scrambling mechanism. As described above, each packet consists of 4 packs. After interleaving, each pack's data is spread over eight consecutive packs and therefore each packet is spread over three consecutive packets or the equivalent of 288 bytes of data. Therefore, this mechanism must be able to read and store at least three packets of subcode R-W channel data before reconstructing the packet through de-scrambling and de-interleaving. Accordingly, the hardware must have storage elements capable of storing 288 bytes of data, as well as complex control circuitry to handle the de-scramble and de-interleave tasks once the data is stored.

What is needed is a method and apparatus which dynamically calculates the final location of each byte within a pack of interleaved and scrambled data as it is received. What is further needed is a method and apparatus which de-interleaves and de-scrambles encoded subchannel R-W data without the use of storage elements.

SUMMARY OF THE INVENTION

A subcode R-W channel data de-interleaving and de-scrambling method and apparatus includes the ability to de-interleave and de-scramble the encoded subchannel data without the necessity of storage elements, by dynamically calculating the final location of each byte of data within a packet as it is read from the CD-Rom. A pack counter monitors the pack number of the current byte of data. An index counter monitors the location of the current data within a pack. A subtractor uses the values from the pack counter and the index counter to obtain an input value, a first portion of which is supplied to a first offset generator. A second portion of the subtractor output is used to select a base address. The first offset generator determines the pack number of the current byte of data after the de-interleave process. A second offset generator receives a value from the index counter and generates a corresponding value. The results from the first offset generator and the second offset generator are both input into a first adder. The output of the first adder is added to the selected base address by a second adder in order to calculate the final address. The final address is transmitted with the current byte of data to an external buffer memory, where it is stored in the specified address. Preferably the present invention is included in a dedicated integrated circuit which calculates the final address of each byte of subchannel R-W data as it is read.

BRIEF DESCRIPTION OF THE DRAWINGS

FIG. 1 illustrates 24 bytes of a first pack's data spread over eight packs by an 8-way interleave.

FIG. 2 illustrates an 8-way interleave of a second pack of data Ei with the first pack of data Di.

DETAILED DESCRIPTION OF THE
PREFERRED EMBODIMENT

Figures 3, 4:
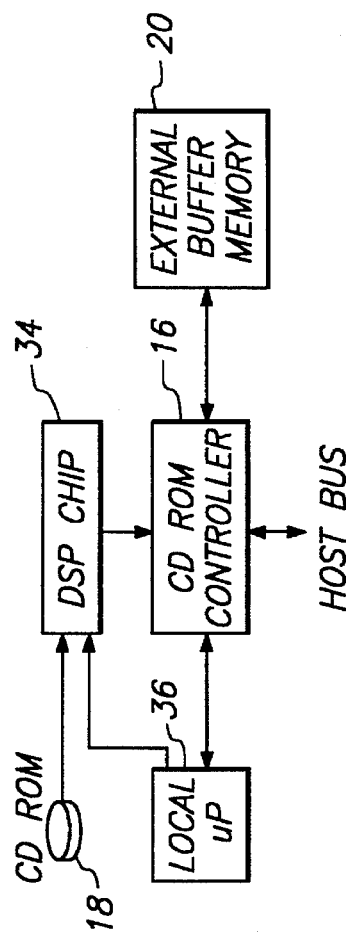
FIG. 3 illustrates the data of a full packet, made up of four packs, each having twenty-four bytes, interleaved and scrambled.
FIG. 4 illustrates a block diagram schematic of a typical CD-Rom system.

A block diagram of a typical CD-Rom system is illustrated in FIG. 4. The CD-Rom 18 is coupled to the digital signal processing (DSP) chip 34. The DSP chip 34 is coupled to the CD-Rom controller 16. The CD-Rom controller 16 is further coupled to the local microprocessor 36, the external buffer memory 20 and the host bus. The local microprocessor 36 controls the operation of the CD-Rom 18 through the DSP chip 34. The controller 16 also controls the transfer of bytes of subchannel R-W data from the CD-Rom 18 to the external buffer memory 20.

Figure 5:
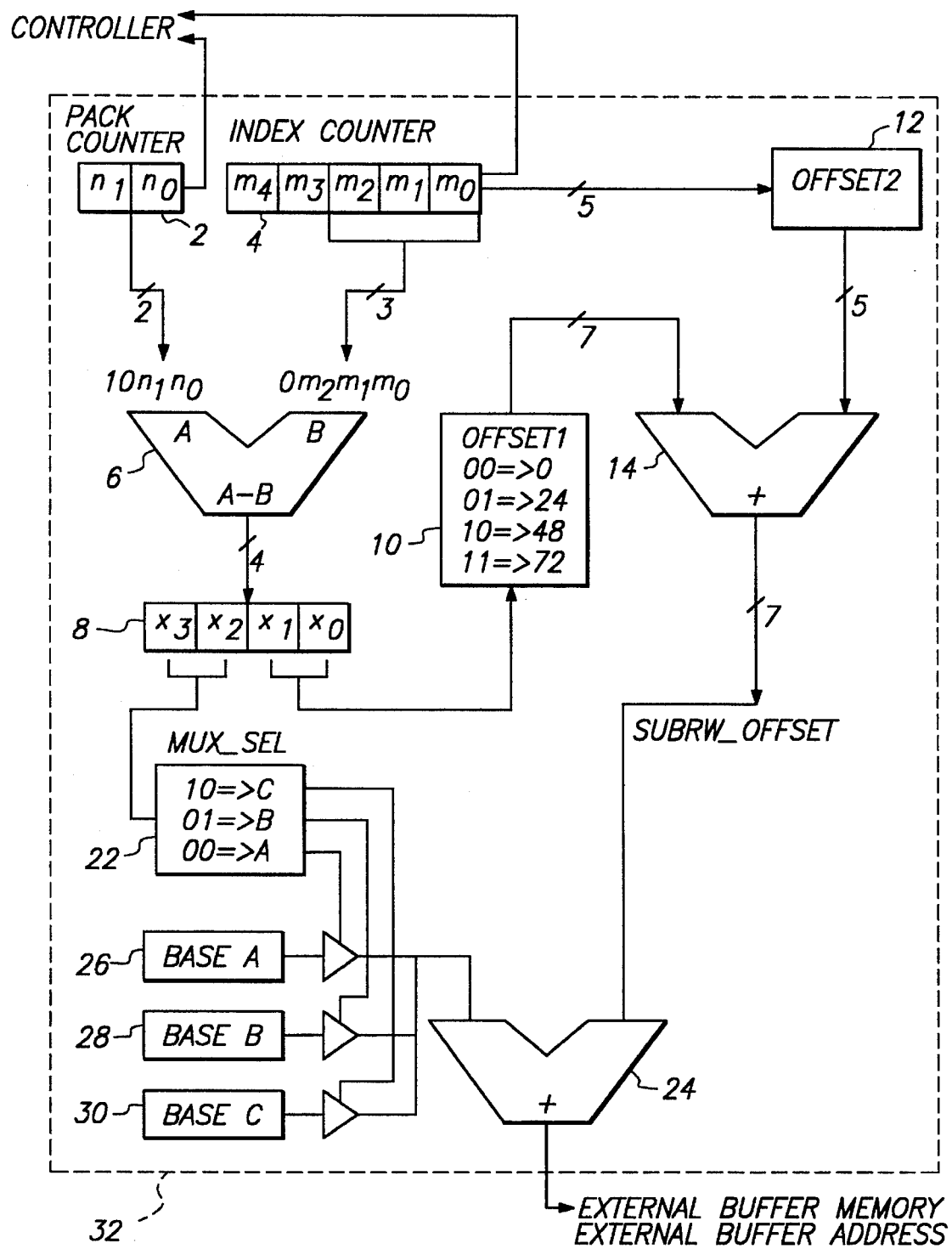
FIG. 5 illustrates a block diagram schematic of the integrated circuit of the preferred embodiment.

A block diagram schematic of the integrated circuit 32 of the preferred embodiment is illustrated in FIG. 5. The controller 16 is coupled to the Pack counter 2 and the Index counter 4.

The Pack counter 2 is a two-bit up counter which counts from zero to three and keeps track of the pack within the packet which the current data byte belongs to. The Pack counter 2 is reset to zero at the beginning of the transmission of a packet of subchannel R-W data. The Pack counter 2 is incremented by one when the current data byte is transferred to the external buffer memory and the Index counter 4 is equal to twenty-three.

The Index counter 4 is a five-bit up counter which counts from zero to twenty-three and keeps track of the location of the current data byte within a pack. The Index counter 4 is reset to zero at the beginning of the transmission for a packet of subchannel R-W data. The Index counter 4 is incremented by one after the current data byte is transferred to the external buffer memory. When the Index counter 4 is equal to twenty-three and the current data byte is transferred to the external buffer memory, the Index counter 4 is then reset to zero.

The two bits from the Pack counter 2 are coupled to the four-bit subtractor 6 as the two least significant bits of the quantity A. The two most significant bits of the quantity A are fixed to always equal a logical "10." The three least significant bits from the Index counter 4 are coupled to the four-bit subtractor 6 as the three least significant bits of the quantity B. The most significant bit of the quantity B is fixed to always equal a logical "0." The subtractor 6 subtracts the quantity B from the quantity A to form the four-bit subtractor output 8.

Figures 6, 7:
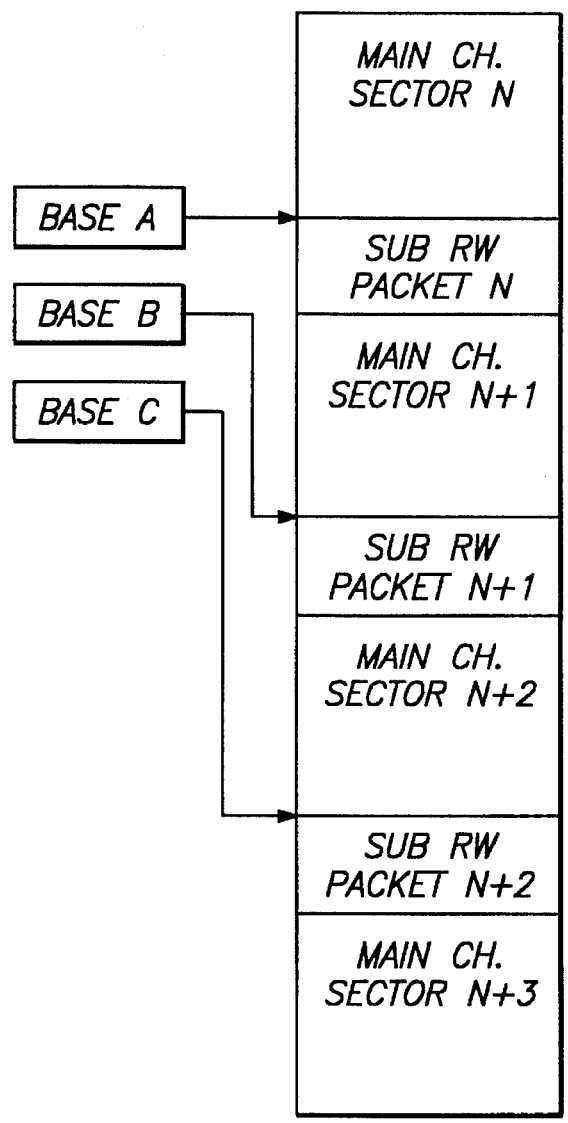
FIG. 6 illustrates the offset table for the second offset generator.
FIG. 7 illustrates the external buffer memory map.

The two most significant bits $x_3$, $x_2$ of the subtractor output 8 are coupled to the multiplexer 22 as the select signal lines. These select signal lines specify which one of the base addresses 26, 28 or 30 are to be used for the current byte of data. The outputs A, B and C of the multiplexer 22 are coupled to the tri-state drivers 40, 42 and 44, respectively. The input of the tri-state driver 40 is coupled to receive the base address A from the register 26. The input of the tri-state driver 42 is coupled to receive the base address B from the register 28. The input of the tri-state driver 44 is coupled to receive the base address C from the register 30. The outputs of the tri-state drivers 40, 42 and 44 are all coupled together as an input to the adder 24. A map of the external buffer memory is illustrated in FIG. 7. As shown in FIG. 7, the base address A is the beginning address of the subchannel R-W data packet N, the base address B is the beginning address of the subchannel R-W data packet N+1 and the base address C is the beginning address of the subchannel R-W data packet N+2.

As illustrated in FIG. 3, after interleaving and scrambling, the data for one packet of subchannel R-W data is spread over eleven packs. Because the pack counter 2 will only count from zero to three, the select signal lines $x_3$, $x_2$ are used to keep track of the pack number where the data was stored. If the current pack is in the group of packs comprised of the packs 0 through 3, then the select signal lines $x_3$, $x_2$ will equal the logical value "00" and specify the base address A. If the current pack is in the group of packs comprised of the packs 4 through 7, then the select signal lines $x_3$, $x_2$ will equal the logical value "01" and specify the base address B. If the current pack is in the group of packs comprised of the packs 8 through 10, then the select signal lines $x_3$, $x_2$ will equal the logical value "10" and specify the group C.

The two least significant bits $x_1$, $x_0$ of the subtractor output 8 are coupled as the inputs to the first offset generator 10. The first offset generator 10 generates four different offsets according to the two least significant bits $x_1$, $x_0$ of the subtractor output 8. The four different offsets of the first offset generator 10 determine the pack number of the current byte of data after it has been de-interleaved. When the first offset generator 10 receives a logical value "00" input, this signals that the current byte of data is part of the first pack D and therefore the offset value "0" is output. When the first offset generator 10 receives a logical value "01" input, this signals that the current byte of data is part of the second pack E and therefore the offset value "24" is output. When the first offset generator 10 receives a logical value "10" input, this signals that the current byte of data is part of the third pack F and therefore the offset value "48" is output. When the first offset generator 10 receives a logical "11" input, this signals that the current byte of data is part of the fourth pack G and therefore the offset value "72" is output. These offset values from the first offset generator 10 form a pack base number for each of the packs D, E, F and G. The number of the current data byte within each of the these packs is generated by the second offset generator 12 and added to the first offset number. For example, for the data byte E12, the first offset value will be equal to "24" because this data byte is in the pack E. The second offset value will then be equal to "12" because this data byte is located in that location within the pack E. These two offset values are added together for a result of "36" which signals the number of the current data byte within the current packet of data. The output of the first offset generator 10 is coupled as an input to the adder 14.

The five bits $m_4$, $m_3$, $m_2$, $m_1$, $m_0$ of the Index counter 4 are all coupled as inputs to the second offset generator 12. The second offset generator 12 generates twenty-four offsets according to the value of the five bits $m_4$, $m_3$, $m_2$, $m_1$, $m_0$. The table of the inputs and their corresponding outputs from the second offset generator 12 is illustrated in FIG. 6. The offset constant value output from the second offset generator 12 represents the number of the byte of data within the pack after it has been de-scrambled. The output of the second offset generator 12 is coupled as an input to the adder 14.

The adder 14 adds the output of the first offset generator 10 to the output of the second offset generator 12 in order to generate the value SUBRW—OFFSET which is used to specify the final location of the current byte of data within the current packet of subchannel R-W data after it has been de-interleaved and de-scrambled. The output of the adder 14 is coupled as an input to the adder 24. The adder 24 adds the appropriate base address to the external buffer memory 20 in order to transfer the external buffer address to the external buffer memory 20 with the current byte of subchannel R-W data. The external buffer address is communicated with the current byte of data when it is transferred to the external buffer memory 20. The external buffer address specifies where within the external buffer memory 20 the current byte of data is to be stored.

In operation, the integrated circuit 32 of the present invention is presented with the interleaved and scrambled data, one byte at a time, in the order that the data is actually read from the CD-Rom 18. The integrated circuit 32 keeps track of the current pack and index number and from these values calculates the number of the current byte of data within the packet after it is de-interleaved and de-scrambled. This number of the byte of data within the packet is transmitted with the byte of data to the external buffer memory 20 where the data is stored in the appropriate corresponding address. The Index counter 4 is then incremented and the number of the byte of data within the packet for the next byte of subchannel R-W data read from the CD-Rom 18 is calculated. If the Index counter 4 is equal to twenty-three, then the Pack counter 2 is incremented also.

As an example, the calculation for the number of the byte of data within the packet for the data byte E18 will be described. When the data byte E18 is read from the CD-Rom 18, the pack counter 2 is equal to the logical value "10" and the index counter is equal to the logical value "00001" because this byte of data when read from the CD-Rom 18 is the second byte of data within the second pack. Using the two bits of data from the Pack counter 2, the value A is equal to a logical value "1010." Using the three least significant bits of data from the Index counter 4, the value B is equal to a logical value "0001." The subtraction operation of A minus B results in the logical value "1001" being output from the subtractor 6. The two most significant bits of this value "10" signal that the multiplexer select signal lines of the multiplexer 22 indicate that the current byte of data is within the packet N+2 and therefore the base address C is used. The two least significant bits of this value "01" are input to the first offset generator 10 and specify that the first offset value should be equal to "24" in order to de-interleave the current byte of data. The binary representation of "24" is equal to "0011000." The value "00001" from the Index counter 4 is also input into the second offset generator 12. The corresponding output from the second offset generator 12 is equal to a logical value of "10010" in order to de-scramble the current byte of data. The logical value "0011000" and the logical value "10010" are then added together by the adder 14. The result, which is equal to "42", specifies the number of the current byte of data within this current packet of subchannel R-W data and is input to the adder 24 and added to the base address C. The result of this addition is output from the adder 24 and transmitted with the current byte of data to the external buffer memory 20.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method of de-interleaving and de-scrambling encoded data read from an optical media source and transmitting an address value with a corresponding byte of data, comprising the steps of:

a. reading a current byte of data from the optical media source;

b. generating a first offset value representing a pack of data to which the current byte of data belongs, using a read pack number and a read index number, both corresponding to a position of the current byte of data within a current packet of data as stored within the optical media source;

c. generating a second offset value representing a position of the current byte of data within the pack of data, using the read index number;

d. adding the first offset value to the second offset value to form a base offset value for the current byte of data, wherein the base offset value represents a de-interleaved and de-scrambled position of the current byte of data within the current packet of data; and e. adding the base offset value to a base address value to form an address value wherein the address value represents a location within a memory storage device where the current byte of data is to be stored.

2. The method as claimed in claim 1 further comprising the step of transmitting the address value with the current byte of data to the memory storage device.

3. The method as claimed in claim 1 wherein the method is implemented within a dedicated integrated circuit.

4. The method as claimed in claim 1 wherein the encoded data is subchannel R-W data and the optical media source is a CD-Rom.

5. The method as claimed in claim 4 wherein the subchannel R-W data is transmitted in a packet of ninety-six bytes of data, divided into four packs, each pack including twenty-four bytes of data.

6. The method as claimed in claim 5 wherein the encoded data is stored on the CD-Rom using an eight-way interleave and scrambling method, wherein the encoded data is scrambled within each pack by swapping a byte 1 with a byte 18, a byte 2 with a byte 5 and a byte 3 with a byte 23.

7. The method as claimed in claim 6 further comprising the steps of:

f. incrementing the read pack number if the read index number is equal to twenty-three;

g. incrementing the read index number; and h. repeating steps a–e for the next byte of encoded subchannel data.

8. An apparatus for de-interleaving and de-scrambling encoded data read from an optical media source and transmitting an address value with a corresponding byte of data comprising:

a. a first offset generator circuit for generating a first offset value representing a pack of data to which a current byte of data belongs, using a read pack number and a read index number, both corresponding to a position of the current byte of data within a current packet of data as stored within the optical media source;

b. a second offset generator circuit for generating a second offset value representing a position of the current byte of data within the pack of data using the read index number; and c. a first adding circuit coupled to the first offset generator circuit and the second offset generator circuit for adding the first offset value to the second offset value to form a base offset value for the current byte of data, wherein the base offset value represents a de-interleaved and de-scrambled position of the current byte of data within the current packet of data; and d. a second adding circuit coupled to the first adding circuit and to receive a base address value for adding the base offset value to the base address value to form an address value.

9. The apparatus as claimed in claim 8 wherein the apparatus is implemented within a dedicated integrated circuit.

10. The apparatus as claimed in claim 9 wherein the apparatus is coupled to a control logic circuit which is coupled to an optical media source for reading the current byte of data from the optical media source.

11. The apparatus as claimed in claim 10 wherein the apparatus is further coupled to an external buffer memory for storing the current byte of data in a storage location corresponding to the address value.

12. The apparatus as claimed in claim 11 wherein the encoded data is subchannel R-W data transmitted in a packet of ninety-six bytes of data, divided into four packs, each pack including twenty-four bytes of data.

13. The apparatus as claimed in claim 12 wherein the optical media source is a CD-Rom and the encoded data is stored on the CD-Rom using an eight-way interleave and scrambling method, further wherein the encoded data is scrambled within each pack by swapping a byte 1 with a byte 18, a byte 2 with a byte 5 and a byte 3 with a byte 23.

14. The apparatus as claimed in claim 13 further comprising a pack counter coupled to the control logic circuit and the first offset generator circuit for keeping track of the read pack number, wherein the pack counter is incremented after the current byte of data is transmitted to the external buffer memory and the read index number is equal to twenty-three.

15. The apparatus as claimed in claim 14 further comprising an index counter coupled to the control logic circuit, the first offset generator circuit and the second offset generator circuit for keeping track of the read index number, wherein the index counter is incremented after the current byte of data is transmitted to the external buffer memory.

16. An apparatus for de-interleaving and de-scrambling encoded data read from an optical media source and transmitting an address value with a corresponding byte of data comprising:

a. a control logic circuit coupled to an optical media source for reading a current byte of data from the optical media source;

b. an index counter coupled to the control logic circuit for keeping track of a read index number which corresponds to an index number of the current byte of data as stored within the optical media source, wherein the index counter is incremented after a current byte of data is de-interleaved and de-scrambled;

c. a pack counter coupled to the control logic circuit for keeping track of a read pack number which corresponds to a pack number of the current byte of data as stored within the optical media source, wherein the pack counter is incremented after a current byte of data is de-interleaved and de-scrambled;

d. a first offset generator circuit coupled to the control logic circuit, the pack counter and the index counter for generating a first offset value representing a pack of data to which the current byte of data belongs;

e. a second offset generator circuit coupled to the control logic circuit and the index counter for generating a second offset value representing a position of the current byte of data within the pack of data;

f. a first adding circuit coupled to the first offset generator circuit and the second offset generator circuit for adding the first offset value to the second offset value to form a base offset value for the current byte of data, wherein the base offset value represents a de-interleaved and de-scrambled position of the current byte of data within the current packet of data;

g. a second adding circuit coupled to the first adding circuit and to receive a base address value for adding the base offset value to the base address value to form an address value; and h. an external buffer memory coupled to the control logic circuit and the adding circuit for storing the current byte of data in a storage location corresponding to the address value.

17. The apparatus as claimed in claim 16 wherein the apparatus is implemented within a dedicated integrated circuit.

18. The apparatus as claimed in claim 17 wherein the encoded data is subchannel R-W data transmitted in a packet of ninety-six bytes of data, divided into four packs, each with twenty-four bytes of data.

19. The apparatus as claimed in claim 18 wherein the optical media source is a CD-Rom and the encoded data is stored on the CD-Rom using an eight-way interleave and scrambling method further wherein the encoded data is scrambled within each pack by swapping a byte 1 with a byte 18, a byte 2 with a byte 5 and a byte 3 with a byte 23.

20. A method of de-interleaving and de-scrambling encoded data read from an optical media source and transmitting an address value with a corresponding byte of data, comprising the steps:

a. reading a current byte of data from the optical media source;

b. reading a two bit pack counter value which corresponds to a pack number of the current byte of data as stored within the optical media source;

c. reading a five bit index counter value which corresponds to an index number within a pack of the current byte of data as stored within the optical media source;

d. subtracting a first value which includes a logical "0" and three least significant bits from the index counter value, from a second value which includes a logical "10" and two bits from the pack counter value, thereby forming a resulting subtractor value, wherein two most significant bits of the resulting subtractor value are used as multiplexer select bits for signalling which group of packs the current pack is in;

e. generating a first offset value representing a pack of data to which the current byte of data belongs, using two least significant bits of the resulting subtractor value;

f. generating a second offset value representing a position of the current byte of data within the pack of data, using the index counter value;

g. adding the first offset value to the second offset value to form a base offset value for the current byte of data, wherein the base offset value represents a de-interleaved and de-scrambled position of the current byte of data within the current packet of data;

h. generating a base address value using two most significant bits of the resulting subtractor value;

i. adding the base address value to the base offset value to form an address value; and j. transmitting the address value with the current byte of data to a memory storage device.

* * * * *